United States Patent [19]

Hayduk et al.

[11] Patent Number: 5,271,288
[45] Date of Patent: Dec. 21, 1993

[54] HELICOPTER NOISE REDUCTION THROUGH GEARING MODIFICATIONS

[75] Inventors: Matthew T. Hayduk, New Haven; Eric W. Jacobs, Cheshire, both of Conn.

[73] Assignee: United Technologies Corporation, Hartford, Conn.

[21] Appl. No.: 848,623

[22] Filed: Mar. 9, 1992

[51] Int. Cl.⁵ .................... F16H 55/06; F16H 57/02
[52] U.S. Cl. .................... 74/462; 74/460; 74/606 R
[58] Field of Search .............. 74/665 A-665 E, 74/467, 606 R, 606 A, 462, 460; 184/6.12, 6.26, 6.18

[56] References Cited

U.S. PATENT DOCUMENTS

| | | | |
|---|---|---|---|
| 3,881,364 | 5/1975 | Rouverol | 74/462 |
| 4,031,770 | 6/1977 | Ishikawa | 74/462 |
| 4,051,492 | 9/1977 | Laskin et al. | 74/462 X |
| 4,051,745 | 10/1977 | Ishikawa | 74/462 |
| 4,259,875 | 4/1981 | Rouverol | 74/462 |
| 4,276,785 | 7/1981 | Rouverol | 74/457 X |
| 4,589,300 | 5/1986 | Rouverol | 74/462 X |
| 4,890,504 | 1/1990 | Carrigan et al. | 74/462 X |
| 5,022,280 | 6/1991 | Boiko et al. | 74/462 |

FOREIGN PATENT DOCUMENTS

| | | | |
|---|---|---|---|
| 0028565 | 2/1991 | Japan | 74/462 |
| 0069844 | 3/1991 | Japan | 74/462 |
| 1537930 | 1/1990 | U.S.S.R. | 74/462 |
| 2224554 | 5/1990 | United Kingdom | 74/462 |

Primary Examiner—Vinh T. Luong
Attorney, Agent, or Firm—Terrance J. Radke

[57] ABSTRACT

A transmission is provided wherein selected configurational parameters of interacting spur gearing are modified to abate the vibration levels thereof due to the effects of differential thermal expansion of the gearbox housing. The chordal addenda of the gear teeth of the interacting spur gearing are extended by a predetermined amount, based upon the computed relative radial displacement of the centerlines thereof due to the differential thermal expansion effects, to provide modified interacting spur gearing having increased outside diameters. Such modified spur gearing provides an effective centerline spacing for the transmission such that the interacting spur gearing thereof has an operating contact ratio greater than the design contact ratio at engine start up. As the transmission reaches stabilized operating conditions the operating contact ratio of the modified spur gearing is substantially equal to the design contact ratio due to the effects of differential thermal expansion on the transmission gearbox housing. In addition, the helix angle of the interacting spur gearing is substantially increased to counteract the effects of differential thermal expansion on the gearbox housing.

4 Claims, 6 Drawing Sheets

HELICOPTER NOISE REDUCTION THROUGH GEARING MODIFICATIONS

RELATED APPLICATION

The present application is related to commonly-owned, U.S. Pat. No. 5,189,929 filed on Mar. 9, 1992, entitled SYSTEM AND METHOD FOR TRANSMISSION GEARBOX NOISE CONTROL UTILIZING LOCALIZED OIL COOLING/HEATING.

FIELD OF THE INVENTION

The present invention is directed to systems and methods for reducing noise levels resulting from transmission vibrations, and more particularly, to configurational modifications in the reduction gearing of a transmission system for abating undesirable noise levels due to differential thermal expansion of the gearbox housing. The system and method of the present invention has particular utility in abating main transmission gearbox noise generation in helicopters such as the S-76 ® (S-76 is a registered trademark of the Sikorsky Aircraft Division of United Technologies Corporation) that incorporate centralized bull gear/bull pinion reduction gearing.

BACKGROUND OF THE INVENTION

Noise control is a primary concern for the transmission design engineer, and particularly so in the design of the helicopter main transmission. Excessive vibrations generated by transmissions typically result in undesirable noise levels in helicopter cockpits and/or cabins, which causes operator/passenger aural discomfort. Cabin and/or cockpit noise abatement is a particular concern in helicopters wherein the final stage of reduction gearing of the main transmission comprises one or more bull pinions interacting with a central bull gear.

For example, Sikorsky helicopters of the S-76 ® series, e.g., S-76A, S-76B, S-76C, have a main transmission that includes three stages of reduction gearing: a first stage for each engine output consisting of helical gearing, an intermediate stage consisting of spiral bevel gearing, and a final reduction stage comprising a central bull gear that intermeshes with right and left hand bull pinions (to combine the inputs of the two engines that provide the motive power for S-76 ® helicopters). Research has shown that the cockpit and/or cabin noise levels of S-76 ® helicopters are primarily the result of vibrations originating in the main transmission.

Figure 1:
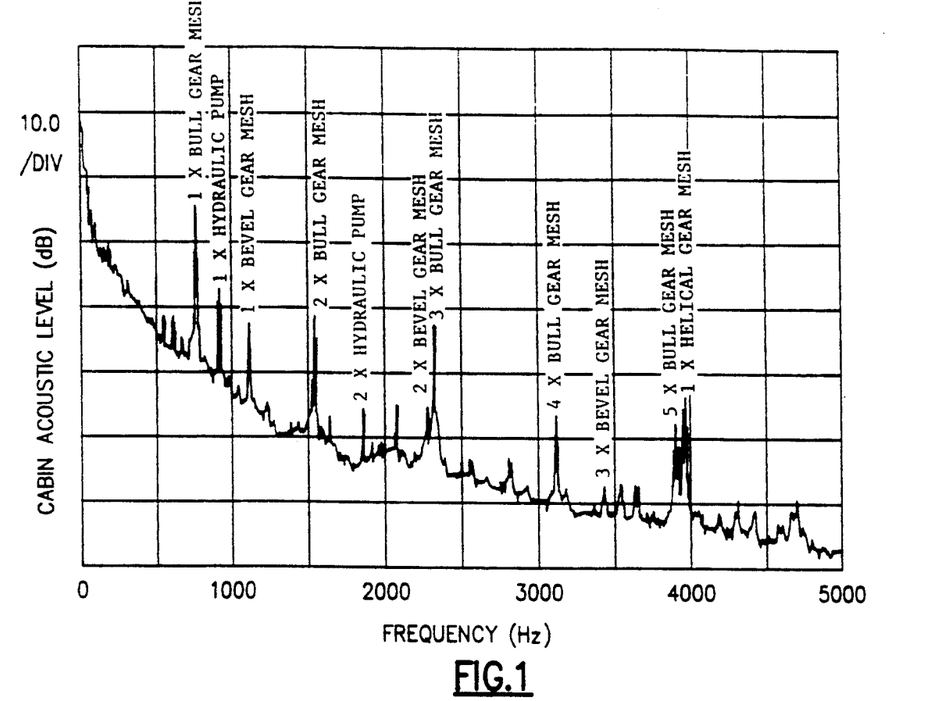
FIG. 1 is a graph illustrating the frequency components of the noise generated by vibrations from an S-76 ® main transmission.

Narrow band Fast Fourier Transform (FFT) analyses, A-weighted octave levels, and overall DBA levels recorded in the cockpits and/or cabins of S-76A, S-76B, and S-76C helicopters indicate that interior noise levels are predominately the result of vibrations occurring at the bull gearing meshing frequency of 778 Hz, as illustrated in FIG. 1. The vibrations produced by the first and second reduction stages of S-76 ® main transmission gearboxes, i.e., the noise levels generated by the helical and spiral gearing as illustrated in FIG. 1, occur at higher frequencies and typically are not significant relative to the dominant noise levels produced by the fundamental and first few harmonics of the bull gearing meshing vibrations.

The gearbox vibrations resulting from bull gear meshing are coupled into the helicopter airframe via the transmission housing. The resultant airframe vibrations generate noise in the helicopter cockpit and/or cabin. Such noise generally cannot be effectively abated by acoustic treatment of the cockpit and/or cabin interior, and therefore, effective noise control solutions must be implemented at the noise source, i.e., the main transmission.

Figure 2:
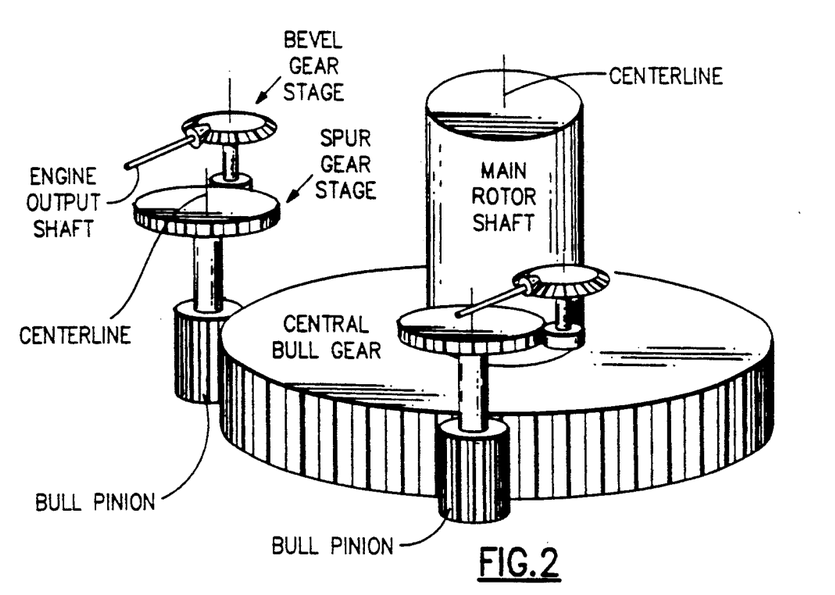
FIG. 2 is a schematic representation of an exemplary three stage main transmission depicting the meshing interaction between the central bull gear and two bull pinions.
Figure 2A:
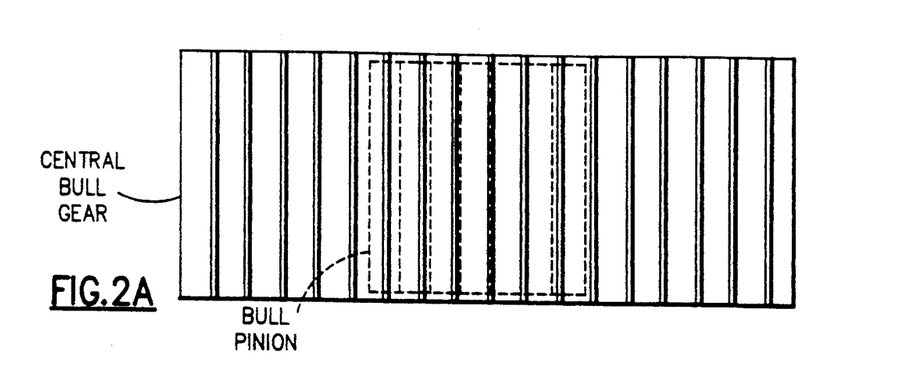
FIG. 2A illustrates an idealized meshing interaction between the central bull gear and a bull pinion of FIG. 2.

To effectively abate such noise, it is necessary to identify the primary causal factor(s) of bull gearing vibrations. The vibrations generated by the aforedescribed helicopter main transmission may be aggravated by meshing between misaligned bull gearing, i.e., the central bull gear and bull pinion(s). FIG. 2 is a schematic representation of an exemplary three stage main transmission that depicts the meshing interaction between the central bull gear and two bull pinions. FIG. 2A illustrates the idealized intermeshing relationship between the central bull gear (illustrated by full lines) and a bull pinion (illustrated by dashed lines) wherein respective bull gear and bull pinion teeth engage completely and simultaneously across corresponding faces.

Previous efforts to reduce the noise levels generated by intermeshing between misaligned bull pinions and the central bull gear included modifications to provide effective bull gear tip relief. While such modifications resulted in some reduction in bull gearing vibrations, the resultant reduced interior noise levels of S-76 ® helicopters were adjudged to still present an unacceptable level of aural discomfort.

A need exists to more fully identify the design and operating parameters that cause main transmission vibrations, and in particular, S-76 ® main transmission vibrations. An effective solution for noise abatement can only be implemented based upon the identification and understanding of the causal parameter(s) of main transmission vibration generation.

SUMMARY OF THE INVENTION

One object of the present invention is the abatement of undesirable noise levels generated by vibrations emanating from main transmissions.

Another object of the present invention is the reduction of vibration levels generated by transmissions due to mismeshing gearing.

Yet another object of the present invention is to minimize gearing mismesh due to differential thermal expansion of localized areas of transmission gearbox housings.

Still another object of the present invention is to minimize gearing mismesh by configurationally modifying interacting gears of a transmission gearbox subject to differential thermal expansion.

A further object of the present invention is to configurationally modify interacting gears to effectively change the centerline spacing therebetween wherein the operating contact ratio of such interacting gears at engine start up is greater than the design contact ratio thereof such that at stabilized transmission operating conditions the operating contact ratio is substantially equal to the design contact ratio.

Yet a further object of the present invention is to configurationally modify interacting gears by increasing the chordal addenda of the gear teeth thereof based upon the computed increase in centerline spacing of such interacting gears due to differential thermal expansion of the transmission gearbox housing wherein the increase in outer diameters of such interacting gears provides the effective change in centerline spacing.

Still a further object of the present invention is to configurationally modify interacting gears by increasing the lead correction of the drive gear thereof to counteract induced canting of such interacting gears due to differential thermal expansion of the transmission gearbox housing.

These and other objects of the present invention are provided by configurational modifications of interacting gearing of the transmission gearbox that are operative to abate interior noise levels caused by transmission gearing vibrations resulting from differential thermal expansion of the transmission gearbox housing. A research program was conducted by the inventors of the instant application to provide a more fundamental understanding of the effects of the design and operating parameters of an S-76 ® main transmission vis-a-vis bull gearing vibration generation. Test data from this program indicates that operating temperature has the most significant impact on main transmission gearbox vibration generation. Test results indicate that bull gearing vibration levels increase approximately 0.1 Db per degree Celsius increase in oil-in temperature to the transmission gearbox.

Further test data indicates that the gearbox housing experiences thermal expansion/deflection effects due to temperature variations among localized areas of the transmission gearbox housing. This data indicates that temperature variations of about 0° C. to about 4° C. exist across localized areas of the upper casing of the gearbox housing, that temperature variations of about 0° C. to about 5° C. exist across localized areas of the lower casing of the gearbox housing, and that temperature variations of about 0° C. to about 8° C. exist for corresponding localized areas between the upper and lower casings of the gearbox housing.

Such temperature variations across and between localized areas of the upper and lower casings of the gearbox housing produce differential thermal expansion effects in and between the upper and lower casings of the gearbox housing. Differential thermal expansion effects, i.e., growth, deflections, in and between the upper and lower casings of the gearbox housings induce spatial misalignments, relative radial displacements of centerlines, induced canting, between the central bull gear and the corresponding bull pinion(s) of the transmission. These spatial misalignments result in mismeshing between such gearing, which causes increases in bull gearing vibration levels.

To counteract such spatial misalignments, the inventors have modified selected configurational parameters of the bull gearing within the constraint of minimizing changes to the existing gearing configurational parameters of the transmission. More specifically, material has been added to the top lands of the gear teeth to configurationally modify the central bull gear and the bull pinions of the transmission. These material additions increase the chordal addenda of all gear teeth of both the modified central bull gear and the modified bull pinions For the S-76 ® transmission, the central modified bull gear and the modified bull pinions have chordal addenda extended by about 0.015 inches.

Such increases in the chordal addenda of the modified central bull gear and the modified bull pinions results in increases in the respective outside diameters of the modified central bull gear and the modified bull pinions, while maintaining pitch diameters thereof constant. In addition, the forgoing modifications of the chordal addenda result in a modified central bull gear and modified bull pinions having base circle diameters and root diameters equivalent to the bull gearing of the prior art S-76 ® transmission gearbox as well as the same number of gear teeth, the same diametral pitch, and the same pressure angle.

The modifications to chordal addenda of the bull gearing according to the present invention are operative to provide an effective centerline spacing for the transmission such that the bull gearing thereof has an operating contact ratio of about 1.83 at engine start up (versus a design contact ratio of about 1.60). As the transmission gearbox reaches stabilized operating conditions the operating contact ratio is substantially equal to the design contact ratio due to the effects of differential thermal expansion on the transmission housing.

In addition, the modified bull pinions according to the present invention are further modified to have an increased lead correction to counteract the differential thermal expansion effects of the transmission gearbox housing. The helix angle of the modified bull pinions is approximately one and two-thirds times as great as the helix angle of the prior art bull pinions.

The foregoing configurational modifications of the bull gearing of the S-76 ® transmission gearbox provide about 4 to 5 dB reductions in gearbox vibration levels at the bull gearing meshing frequency. This results in a significant reduction in interior noise levels in the S-76 ® helicopter.

BRIEF DESCRIPTION OF THE DRAWINGS

A more complete understanding of the present invention and the attendant features and advantages thereof may be had by reference to the following detailed description when considered in conjunction with the accompanying drawings wherein.

DETAILED DESCRIPTION OF PREFERRED EMBODIMENTS

A research program was conducted by the inventors named hereinabove to provide a more fundamental understanding of the effects of the design and operating parameters of an S-76 ® main transmission vis-a-vis bull gearing vibration generation. Operating parameters investigated included main rotor and tail rotor torque, speed, oil temperature, oil type, oil distribution, oil service level, and temperature effects on the gearbox housing. Housing temperature effects were investigated in light of the fact that the main transmission gearbox housing of the S-76 ® helicopter series is generally fabricated from magnesium or magnesium alloys (for weight savings), which have a coefficient of thermal expansion more than twice as great as the steel reduction gearing of such transmissions (about $14.5 \times 10^{-6}$ in/in/°F. versus $6.33 \times 10^{-6}$ in/in/°F.).

Test results revealed that variations in oil service levels and modifications in oil distribution systems produced no noticeable effects on bull gearing vibration levels. Comparisons of Mil-spec petroleum-based oils, nonpetroleum-based synthetic oils, and commercial oils indicate that small reductions in bull gearing vibration levels could be achieved using Mil-spec type oils. The noise abatement effects produced by utilizing such Mil-spec type oils, however, were inconsistent with respect to various harmonics of the bull gearing vibration spectrum.

Tail rotor take-off torque data indicated a linear increase in bull gearing vibration levels of about 0.8 dB per ten percent increase in tail rotor torque over the range of forty to one hundred percent of full rating. Test data also showed that bull gearing vibration levels generally increased as expected with increases in torque at equivalent speeds. Test data further showed a pronounced rise in bull gearing vibration levels with increases in speed (at given torque settings) from about 90% $N_r$ to 107% $N_r$.

Test data reveals, however, that operating temperature has the most significant impact on main transmission vibration generation. Test results indicate that bull gearing vibration levels increase approximately 0.1 dB per degree Celsius increase in oil-in temperature to the gearbox (the baseline oil-in temperature of the S-76 ® main transmission is about 160° F. (71° C.)). In contrast, the vibration levels of the S-76 ® bevel gearing stage exhibit a decreasing trend with increases in oil-in temperature while the vibration levels of the helical gearing stage show no constant trend with changes in oil-in temperature. Since the bevel gears are mounted on corresponding bull pinion shaft assemblies, the foregoing effects indicate that thermally induced gear mismeshing and not decreases in oil viscosity with increasing temperature are significantly affecting bull gearing vibration generation.

Based upon the nature of the aforedescribed effects of operating temperature, a NASTRAN finite element model of the S-76 ® main transmission gearbox housing was developed to examine gearbox housing thermal expansion/deflection effects due to operating temperature. Localized surface areas of the upper and lower casings of the gearbox housing were instrumented to provide temperature data for selected housing surface areas. Test data indicates that temperature variations of about 0° C. to about 4° C. exist across such localized surface areas of the upper casing of the gearbox housing, that temperature variations of about 0° C. to about 5° C. exist across such localized surface areas of the lower casing of the gearbox housing, and that temperature variations of about 0° C. to about 8° C. exist between corresponding localized surface areas of the upper and lower casings of the gearbox housing.

These temperature variations are due primarily to the disposition of the S-76 ® main gearbox housing with respect to the helicopter airframe. The upper casing of the gearbox housing is exposed to environmental operating conditions while the lower casing is shrouded within the helicopter airframe. Thus, the upper casing of the gearbox housing is subjected to different convective and radiative heat transfer effects than the lower casing such that the upper casing of the gearbox housing has lower overall temperatures than the lower casing in general.

The temperature variations across such localized areas of the upper and lower casings, respectively, produce differential thermal expansion effects in the corresponding upper and lower casings of the gearbox housing, i.e., respective localized areas of the upper and lower casings of the gearbox housing experience different rates of thermal expansion (growth; deflections). In addition, the temperature variations between corresponding localized areas of the upper and lower casings produce differential thermal expansion effects between the upper and lower casings.

Such differential thermal expansions of the gearbox housing produce diverse effects. To facilitate a better understanding of the effects of differential thermal expansion in the gearbox housing on bull gearing vibration generation, reference is made to FIGS. 3A, 3B which illustrate an S-76 ® main transmission 100. The transmission 100 comprises a housing 102 formed by an upper conical casing 104 secured in combination with a lower base casing 106 by means of bolts 108. The transmission housing 102 is typically machined from high strength-to-weight ratio materials such as AZ 91C or ZK 60A magnesium alloys. A central bull gear 110 is mounted for rotation within the gearbox housing 102 by means of support bearings 112 disposed in combination with upper and lower stub axles 114, 116, respectively. Ends of the upper and lower stub axles 114, 116 are connected to the upper conical casing 104 and the lower base casing 106, respectively.

Figure 3A:
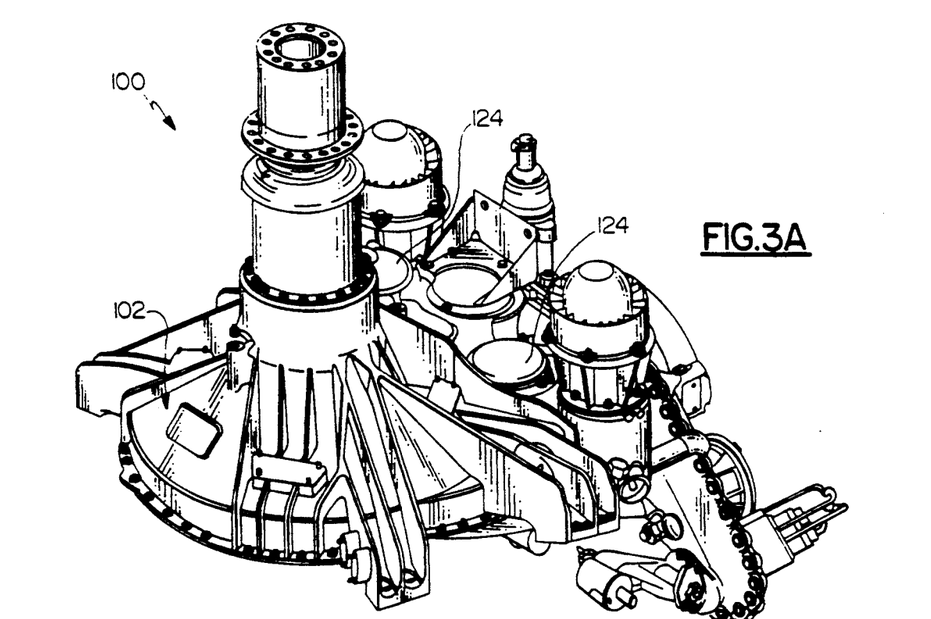
FIG. 3 is an external perspective view of an S-76 ® main transmission gearbox.
Figure 3B:
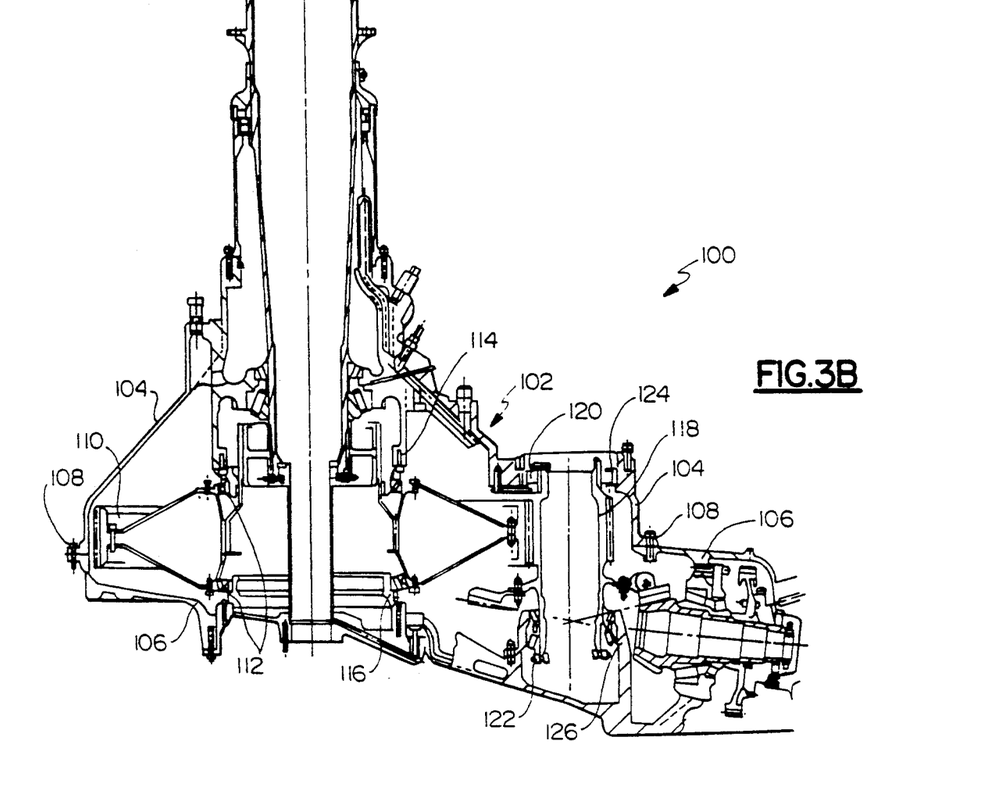
FIG. 3B is an internal cross-sectional view of the gearbox of FIG. 3A.

Two bull pinions 118 are mounted for rotation within the gearbox housing 102 by means of pinion bearings 120, 122 disposed in combination with upper and lower pinion supports 124, 126, respectively. Ends of the upper and lower pinion supports 124, 126 are connected to the upper conical casing 104 and the lower base casing 106, respectively.

Differential thermal expansion of localized areas of the upper conical casing 104 and/or the lower base casing 106 of the gearbox housing 102 causes relative displacements among the upper stub axle 114, the lower stub axle 116, the upper pinion support 124, and/or the lower pinion support 126, and in consequence, the bull pinions 118 and the central bull gear 110. Such displacements directly affect the spatial orientations (meshing interactions) between the central bull gear 110 and the bull pinions 118. This, in turn, induces mismeshing between the teeth of the central bull gear 110 and the bull pinions 118, which results in increases in bull gearing vibration levels.

The NASTRAN finite element model indicates that differential thermal expansion of respective localized areas of the magnesium gearbox housing produces relative radial displacements between the centerlines of the left and right bull pinions and the central bull gear by about 0.027 and 0.023 inches, respectively, at a stabilized oil-in temperature of about 160° F. (71° C.). The predicted displacements increase to about 0.043 and 0.034 inches, respectively, at an oil-in temperature of about 230° F. (110° C.).

While the steel gearing also experiences some thermal expansion (about 0.010 inches at 160° F.), there is still a displacement disparity sufficient to induce spatial misalignment(s) between the central bull gear and the corresponding bull pinion(s). As a result, the bull gearing operating contact ratios decrease to a value of about 1.52 (versus a design contact ratio value of about 1.60). Vibration generation due to bull gearing mismeshing increases with increasing deviance between the design contact ratio and the effective operating contact ratio.

Figure 4:
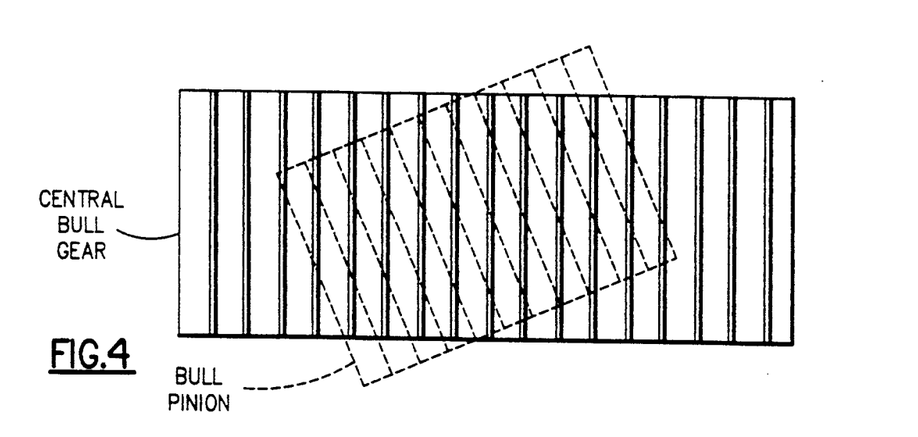
FIG. 4 depicts canting between the central bull gear and the bull pinion of FIG. 2 induced by differential thermal expansion of the gearbox housing.

In addition to the differential thermal expansion effect described in the preceding paragraph, i.e., relative radial displacements, differential thermal expansion may induce canting between each bull pinion 118 and the central bull gear 110, as illustrated in FIG. 4 (exaggerated for purposes of illustration) as contrasted with the idealized meshing relationship illustrated in FIG. 2A. The bull gearing is designed for simultaneous meshing engagement across the face width of respective teeth of each bull pinion and the central bull gear. The induced canting between the bull pinions and the central bull gear, as a result of differential thermal expansion of localized areas of the gearbox housing, causes respective teeth to be meshingly engaged over only a portion of the face width at any instant of time. Such induced canting also increases the vibration levels generated by the bull gearing.

The results of the research program conducted by the inventors, as described hereinabove, shows that there is a direct correlation between transmission operating temperatures and transmission vibration levels, i.e., noise. Normal gearbox operating temperatures are sufficient to cause differential thermal expansion of localized areas of the gearbox housing. This, in turn, induces spatial misalignments between the central bull gear and the corresponding bull pinion(s), resulting in increased vibration levels.

To counteract the spatial misalignments experienced by the bull gearing due to differential thermal expansion of the transmission housing, i.e., relative radial displacements between the centerlines of the bull gearing and/or induced canting, the inventors have modified selected configurational parameters of the bull gearing to counteract such differential thermal expansion effects. While these modifications are discussed hereinbelow in terms of the S-76® transmission, it is to be understood that such modifications may be incorporated in other transmissions systems that employ a bull gearing reduction stage and/or gearing stages that employ interacting spur gears to abate gearing vibration levels caused by differential thermal expansion effects in the gearbox housing.

To facilitate a better understanding of these configurational modifications and their utility in counteracting bull gearing spatial misalignments, reference is made to FIGS. 5A, 5B which illustrate the general configuration and terminology for the parameters of a conventional spur gear and spur gear tooth, respectively, as exemplified by the central bull gear 110 and/or the bull pinions 118 of the S-76® transmission 100 described hereinabove. This terminology is utilized in the detailed description of the bull gearing configurational modifications comprising the present invention as presented hereinbelow.

The configuration of the bull gearing of the S-76® transmission 100 is based upon involute profiles. For the tooth profiles of such gearing, an involute is defined as the curve traced by a point on a line as the line rolls on a base circle BC (the involute curve establishes the tooth profile outward of the base circle), as illustrated in FIG. 5A. Accordingly, any straight line drawn tangent to the base circle BC is normal to the involute at its point of intersection. The base diameter BD defines the diameter of the base circle BC. The base diameter BD is a fundamental and cannot be changed for a given involute.

Figure 5A:
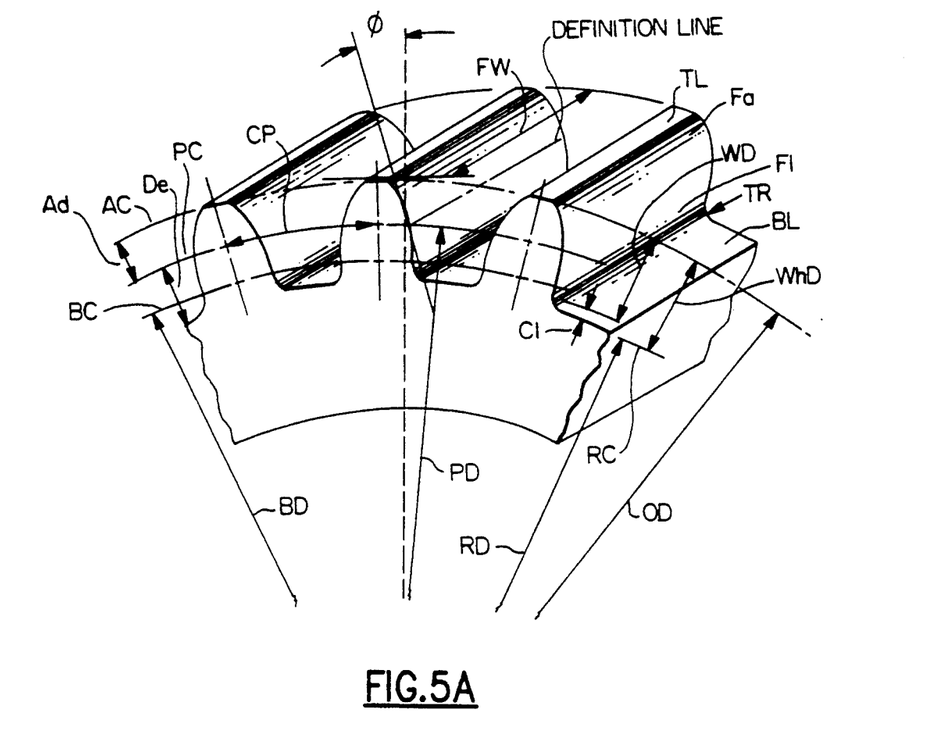
FIG. 5A is a perspective view illustrating the configuration of an exemplary spur gear.
Figure 5B:
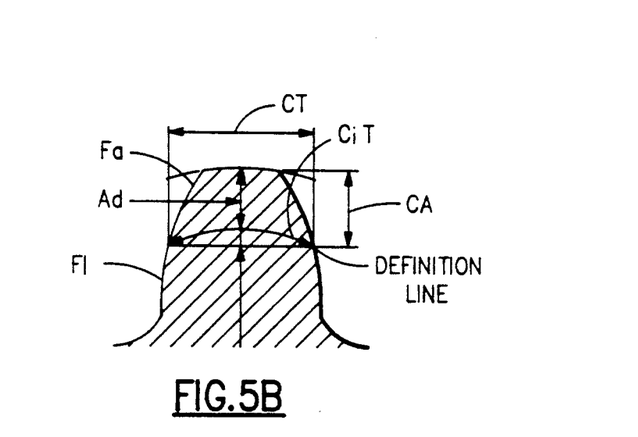
FIG. 5B is a cross-sectional view of a gear tooth of FIG. 5A.

The pitch circle PC of the gear illustrated in FIG. 5A defines the curve of intersection of a pitch surface of revolution, i.e., imaginary planes, cylinders, or cones that roll together without slipping, and a plane of rotation. The pitch circle PC is an imaginary circle that rolls without slipping with respect to the pitch circle of an interacting gear. Pitch diameter PD defines the diameter of the pitch circle PC. The pitch circle PC exists as a valid gear parameter only when two involute profiles are in contact, i.e., interaction between gears.

Diametral pitch DP is the ratio of the number of teeth to the number of inches in the pitch diameter PD. Circular pitch CP is the distance along the pitch circle PC between corresponding profile points of adjacent teeth. There is a fixed relation between diametral pitch DP and circular pitch CP, to wit, (DP)(CP)=pi. Base pitch BP is similar to circular pitch CP, except measured with respect to the base circle BC.

The root circle RC defines the tangent to the bottom lands BL between adjacent gear teeth in cross section. Root diameter RD defines the diameter of the root circle RC.

The addendum circle AC coincides with the top lands TL of the individual gear teeth. Outer diameter OD defines the diameter of the addendum circle AC. The addendum Ad represents the radial distance between the pitch circle PC and the addendum circle AC (see also FIG. 5B). The addendum Ad describes the radial distance by which individual gear teeth project beyond the pitch circle PC. The dedendum De represents the radial distance between the pitch circle PC and the root circle RC. The dedendum De defines the depth of tooth space below the pitch circle PC.

Clearance Cl defines the amount by which the dedendum De exceeds the addendum Ad of an interacting gear. Working depth WD defines the depth of engagement of interacting gears, and equals the sum of the addenda Ad of such gears. Whole depth WhD is the total depth of a tooth space, and equals the addendum Ad plus the dedendum De. Whole depth WhD also equals the working depth WD plus the clearance Cl.

The face Fa of a gear tooth is defined as the tooth surface thereof outside the pitch circle PC. The flank Fl of a gear tooth is defined as the tooth surface between the pitch circle PC and the root circle RC. The face width of each tooth is defined by FW. The tooth fillet radius TR describes the tooth surface intermediate the flank Fl and the bottom land BL. The chordal addendum CA, as depicted in FIG. 5B, describes the minimum straight line distance between a top land TL and the corresponding face Fa - flank Fl definition line (the definition line, in turn, is defined by the intersection of the pitch circle PC with the involute surfaces of the individual gear teeth). The chordal thickness CT describes the straight line distance between the face Fa - flank Fl definition lines of a gear tooth. Circular thickness CiT, in contrast, describes the length of the arc (along the pitch circle PC) between the face Fa - flank Fl definition lines of a gear tooth. Backlash Ba defines the amount by which the width of a tooth space exceeds the thickness of an engaging tooth on the pitch circles PC.

When involute teeth of interacting gears are in contact, the common normal or line of transmission is the straight line tangent to both base circles BC. This line may also be defined as the line of action or the pressure line. The pressure line intersects the line of centers of interacting gears at the pitch point P (for interacting gears with a constant angular-velocity ratio). The pitch point P also describes the point where the pitch circles PC of interacting gears are tangent. Initial contact between interacting gear teeth occurs where the addendum circle AC of the driven gear intersects the pressure line, and final contact occurs where the addendum circle AC of the driving gear intersects the pressure line. The contact ratio for interacting gears is defined as the ratio of path contact to the base pitch.

The useful component of force transmitted between interacting gears is that acting perpendicular to the line of centers. The angle between the pressure line and the perpendicular to the line of centers, defined as the pressure angle $\phi$, is important in relation to the strength and wear of the gear teeth and in relation to the forces acting on the gear shaft and bearings. The pressure angle $\phi$ exists as a valid gear parameter only when two involute profiles are in contact.

The configurational parameters that define the bull gearing of the prior art S-76® transmission 100 described hereinabove, i.e., the bull pinions 118 and the central bull gear 110, are set forth in Tables I and II hereinbelow, respectively. These interacting gears have a design centerline spacing of about 14.75 inches (rounded-off to two significant digits), based upon the respective pitch radii of the central bull gear 110 and the bull pinions 118. The bull pinions 118 are configured with a right-hand helix correction of about 0.0016 to about 0.0018 in/in to compensate for torque loading during operation of the transmission gearbox 100.

TABLE I

| 76351-09612-101 BULL PINION | |
| --- | --- |
| No. Teeth: | 28 |
| Diametral Pitch: | 6.000 |
| Pressure Angle: | 25.0 |
| Pitch Diameter: | 4.66667" |
| Base Circle Diameter: | 4.22944 |
| Outside Diameter: | 5.0564–5.0614" |
| Root Diameter: | 4.2750–4.2850" |
| Chordal Tooth Thickness: | .2871–.2887" |
| Chordal Addendum: | .1993–.2018 |
| Dimension over 2: | .288 |
| Diameter Pins: | 5.1176–5.1204" |
| Max. Involute Profile Error | |
| at T.I.F.: | +.0002/−.0003 |
| at Tip: | −.0009/−.0013 |
| Max. T.I.F. Diameter: | 4.4024" |
| Rotational Backlash: | .005–.008 |
| Fillet Radius: | .0474–.0574" |
| Right Hand Helix | |

TABLE I-continued

| 76351-09612-101 BULL PINION | |
| --- | --- |
| Correction: | .0016–.0018 in/in |
| Helix Angle: | 0 5′ 51″ |
| Lead: | 8623.986 |

TABLE II

| 76351-09633-101 BULL SPUR GEAR | |
| --- | --- |
| No. Teeth: | 149 |
| Diametral Pitch: | 6.000 |
| Pressure Angle: | 25.0 |
| Pitch Diameter: | 24.8333" |
| Base Circle Diameter: | 22.5066" |
| Outside Diameter: | 25.1414–25.1464" |
| Root Diameter: | 24.3600–24.3700" |
| Chordal Tooth Thickness: | .2220–.2235" |
| Chordal Addendum: | .1545–.1570" |
| Dimension over 2: | .288 |
| Diameter Pins: | 25.1545–25.1577" |
| Max. Involute Profile Error | |
| at T.I.F.: | +.0002/−.0003 |
| at Tip: | −.0006/−.0010 |
| Max. T.I.F. Diameter: | 24.4947" |
| Rotational Backlash: | .0050–.0080 |
| Fillet Radius: | .0563–.0663" |

As discussed hereinabove, the inventors discovered that differential thermal expansion of respective localized areas of the S-76® magnesium gearbox housing 102 produces relative radial displacements between the centerlines of the left and right bull pinions and the central bull gear by about 0.027 and 0.023 inches, respectively, at a stabilized oil-in temperature of about 160° F. (71° C.), i.e., the corresponding centerline spacing increases to about 14.777 and 14.773 inches, respectively. The predicted displacements increase to about 0.043 and 0.034 inches, respectively, at an oil-in temperature of about 230° F. (110° C.), i.e., the centerline spacing increases to about 14.793 and 14.784 inches, respectively. Such displacements in centerline spacing are mitigated to a certain degree by the corresponding thermal expansion of the steel bull gearing as described hereinabove. There is, however, a net increase in centerline spacing above the design centerline spacing such that the effective operating contact ratio of the prior art bull gearing is 1.52 (versus the design contact ratio of 1.60), which is sufficient to increase gearbox vibration levels.

Once the inventors recognized that differential thermal expansion of the gearbox housing was inducing such displacements, which were, in turn, causing increased bull gearing vibration levels (due to bull gearing mismeshing), it then became a question of counteracting such displacement effects while minimizing changes to the existing gearing configurational parameters set forth in Tables I and II. As noted hereinabove, the base diameter BD of the base circle BC for the prior art bull gearing is a fixed fundamental for a given involute tooth profile. Furthermore, the pitch circles PC of the bull gearing, defined by the respective pitch diameters PD, are based upon the interactions between the given involute tooth profiles of the prior art bull gearing.

To counteract the centerline relative radial displacements described hereinabove, the inventors have added material to the top lands TL of the gear teeth of the central bull gear and the bull pinions. These material additions increase the chordal addenda CA of all gear teeth of both the central bull gear 110M and the bull pinions 118M by about 0.015 inches, i.e., the teeth are lengthened beyond AGMA (American Gear Manufacturing Association) standards. The chordal addenda $CA_{118M}$ for the gear teeth of the modified bull pinions 118M according to the present invention have a value within the range of about 0.2142 to about 0.2168 inches, as set forth in Table III and as schematically illustrated in FIG. 6B. This represents about a 7.48 percent increase in the value of the chordal addendum CA, based upon the mean chordal addendum $CA_{118}$ of the prior art bull pinion 118, as set forth in Table I.

Figure 7A:
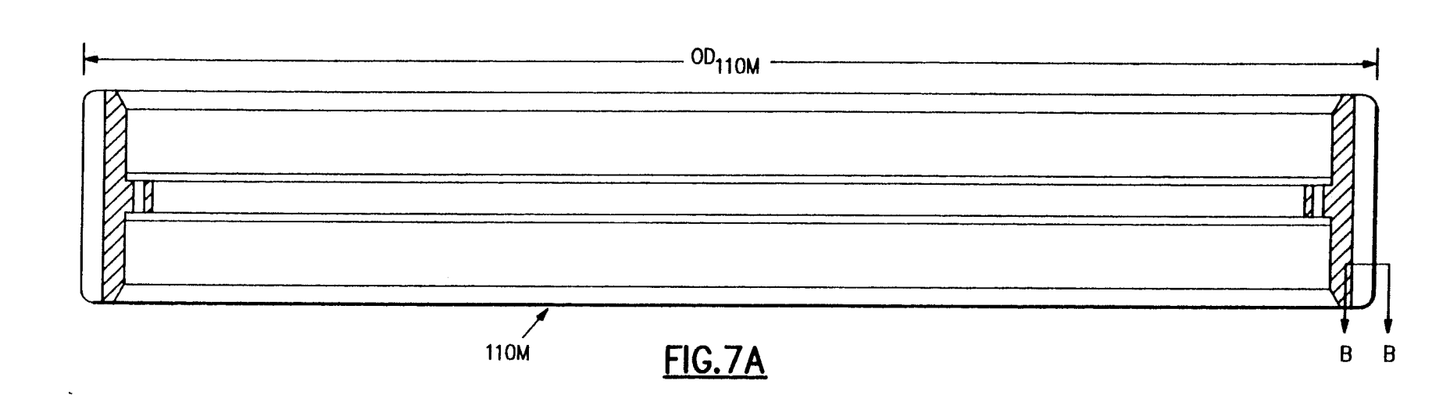
FIG. 7A is a cross-sectional view of a modified central bull gear according to the present invention.
Figure 7B:
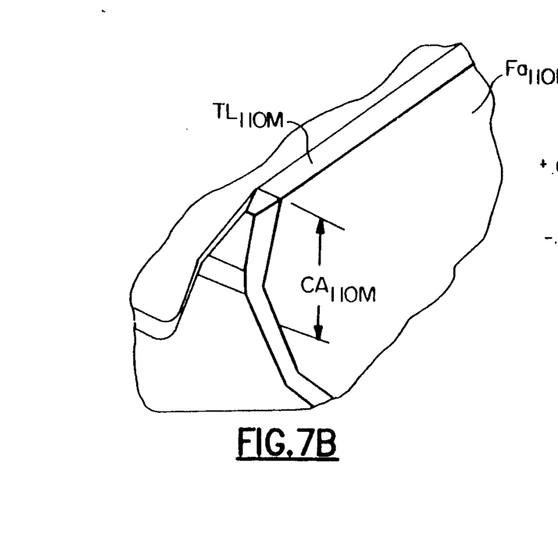
FIG. 7B is a partial cross-sectional view, taken along line B—B of FIG. 7A, of a gear tooth of the modified central bull gear.

The chordal addenda $CA_{110M}$ for the gear teeth of the modified central bull gear 110M according to the present invention have a value within the range of about 0.1695 to about 0.1720 inches, as set forth in Table IV and as schematically illustrated in FIG. 7B. This represents about a 9.63 percent increase in the value of the chordal addendum CA, based upon the mean chordal addendum $CA_{110}$ of the prior art central bull gear 110, as set forth in Table II.

Figure 6A:
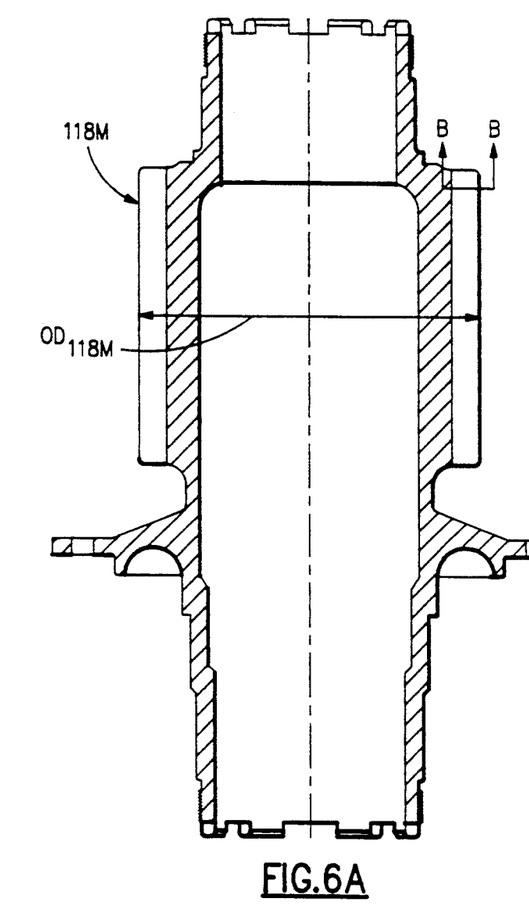
FIG. 6A is a cross-sectional view of a modified bull pinion according to the present invention.
Figure 6B:
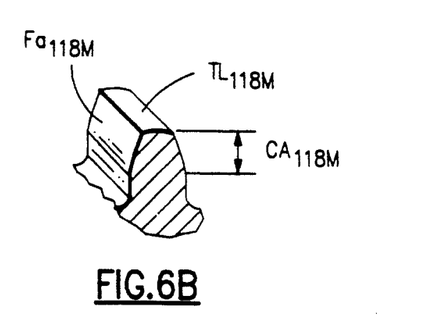
FIG. 6B is a partial cross-sectional view, taken along line B—B of FIG. 6A, of a gear tooth of the modified bull pinion.

The aforedescribed 0.015 inch increases in the bull pinion chordal addenda $CA_{118M}$ result in modified bull pinions 118M having an increased outside diameter $OD_{118M}$ within the range of about 5.0864 inches to about 5.0914 inches (an overall increase of about 0.030 inches), as set forth in Table III and as schematically illustrated in FIG. 6A, while maintaining a constant pitch diameter $PD_{118}$. This represents about a 0.59 percent increase in outside diameter OD based upon the mean outside diameter $OD_{118}$ of the prior art bull pinion 118, as set forth in Table I.

The aforedescribed 0.015 inch increases in the central bull gear chordal addenda $CA_{110M}$ result in a modified central bull gear 110M having an increased outside diameter $OD_{110M}$ within the range of about 25.1714 to about 25.1764 inches (an overall increase of about 0.030), as set forth in Table III and as schematically illustrated in FIG. 7B, while maintaining a constant pitch diameter $PD_{110}$. This represents about a 0.12 percent increase in outside diameter OD based upon the mean outside diameter $OD_{110}$ of the prior art central bull gear 110, as set forth in Table II.

TABLE III

| 76351-09612-102 BULL PINION | |
|---|---|
| No. Teeth: | 28 |
| Diametral Pitch: | 6.000 |
| Pressure Angle: | 25.0 |
| Pitch Diameter: | 4.66667" |
| Base Circle Diameter: | 4.22944" |
| Outside Diameter: | 5.0864–5.0914" |
| Root Diameter: | 4.2750–4.2850" |
| Chordal Tooth Thickness: | .2870–.2885" |
| Chordal Addendum: | .2142–.2168" |
| Dimension over 2: | .288 |
| Diameter Pins: | 5.1144–5.1172" |
| Max. Involute Profile Error | |
| at T.I.F.: | +.0002/−.0003 |
| at Tip: | −.0011/−.0015 |
| Max. T.I.F. Diameter: | 4.3921" |
| Fillet Radius: | .0470–.0570" |
| Right Hand Helix | |
| Correction: | .0027–.0029 in/in |
| Helix Angle: | 0 10' 19" |
| Lead: | 4886.325 |

TABLE IV

| 76351-09633-102 BULL SPUR GEAR | |
|---|---|
| No. Teeth: | 149 |
| Diametral Pitch: | 6.000 |
| Pressure Angle: | 25.0 |
| Pitch Diameter: | 24.8333" |
| Base Circle Diameter: | 22.50665" |
| Outside Diameter: | 25.1714–25.1764" |
| Root Diameter: | 24.3600–24.3700" |
| Chordal Tooth Thickness: | .2220–.2235" |
| Chordal Addendum: | .1695–.1720" |
| Dimension over 2: | .3546 |
| Diameter Pins: | 25.3459–25.3491" |
| Max. Involute Profile Error | |
| at T.I.F.: | +.0002/−.0003 |
| at Tip: | −.0008/−.0012 |
| Max. T.I.F. Diameter: | 24.4814" |
| Fillet Radius: | .056–.066" |

Figure 6C:
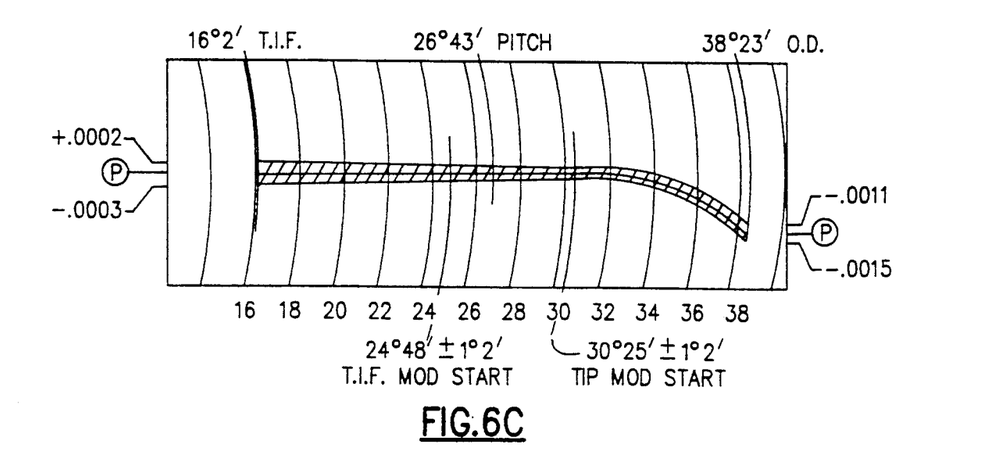
FIG. 6C is an involute profile chart for the gear teeth of the modified bull pinion of the present invention.
Figure 7C:
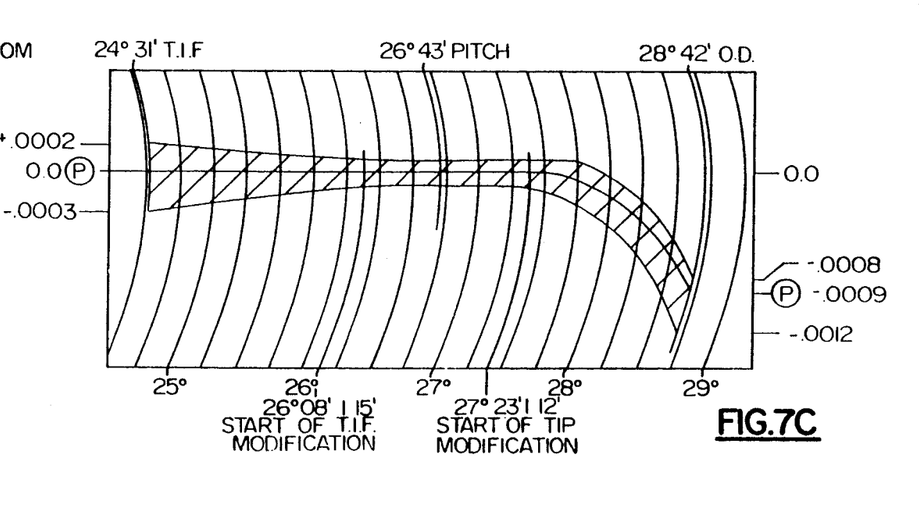
FIG. 7C is an involute profile chart for the gear teeth of the modified central bull gear of the present invention.

The involute profile charts that define the gear teeth of the modified bull pinions 118M and the modified central bull gear 110M of the present invention are illustrated in FIGS. 6C and 7C, respectively. For the modified bull pinions 118M, each gear tooth T.I.F. starts at a roll angle of 16° 2', (versus 16° 33' for the prior art bull pinions 118) and each gear tooth tip modification extends from a roll angle of 30° 25'±1° 2' to a roll angle of 38° 23' (versus 30°25'±1° 2' to 37° 40' for the prior art bull pinions 118). The maximum/minimum allowable involute profile error over such roll angles is greater for the modified bull pinion 118M as compared to the prior art bull pinion 118 (see Tables I and III for maximum/minimum allowable involute profile errors at the tooth tip). As an examination Tables I and III reveals, the maximum T.I.F. diameter of the modified bull pinions 118M is less than the prior art bull pinions 118 so as to accommodate the increased chordal addenda $CA_{110M}$, i.e., tooth length, of the modified central bull gear 110M. The break edge of each gear tooth of the modified bull pinions 118M, which defines the top land $TL_{118M}$ thereof, is about 0.005–0.010 rad.

For the modified central bull gear 110M, each gear tooth T.I.F. starts at a roll angle of 24° 31' (versus 24° 36' for the prior art central bull gear 110M) and each gear tooth tip modification extends from a roll angle of 27° 23'±12' to a roll angle of 28° 42' (versus 27°23'±12' to 28° 33' for the prior art central bull gear 110). The maximum/minimum allowable involute profile error over such roll angles is the same for both the modified central bull gear 110M and the prior art central bull pinion 110, except for the maximum/minimum allowable involute profile errors at the tooth tip (see Tables I and III). As an examination of Tables I and III reveals, the maximum T.I.F. diameter of the modified central bull gear 110M is less than the prior art central bull gear 110 so as to accommodate the increased chordal addenda $CA_{118M}$, i.e., tooth length, of the modified bull pinions 118M. The break edge of each gear tooth of the modified central bull gear 110M, which defines the top land $TL_{110M}$ thereof, is about 0.005–0.010 rad. In addition, the ends of each gear tooth may be optionally chamfered, as illustrated in FIG. 7B.

The inventors have described herein a modified transmission 100M wherein there is a high degree of commonality between the basic design parameters of the prior art transmission 100 and the modified transmission 100M of the present invention. The specific dimensions of the pitch diameter PD, the base circle diameter BD, and the root diameter RD are equivalent for the prior art transmission 100 and the modified transmission 100M of the present invention. The number of gear teeth, the diametral pitch DP, and the pressure angle are likewise equivalent. There is also substantial equivalence between the chordal thicknesses CT and the tooth fillet radii TR.

The modified central bull gear 110M and the modified bull pinions 118M of the present invention, as described hereinabove, are operative in interactive combination to provide an "effective" centerline spacing for the transmission 100. That is, the interactive combination of the modified central bull gear 110M and the modified bull pinions 118M provide operating contact ratios of about 1.83 (versus the design contact ratio of about 1.60) at engine start up. As the transmission 100M reaches its stabilized operating condition (oil-in temperature of about 160° F. (71° C.)), the effective centerline spacing of the bull gearing is substantially equal to the design centerline spacing due to the effect of the increased chordal addenda $CA_{110M}$, $CA_{118M}$, of the gear teeth of the modified central bull gear 110M and the modified bull pinions 118M, respectively. Thus, at the stabilized operating condition, the operating contact ratio of the modified bull gearing of the present invention is substantially equal to the design contact ratio, i.e., about 1.60. The modifications to the bull gearing described hereinabove provide a reduction of about 2 to about 3 dB in bull gearing vibration levels.

Figure 8:
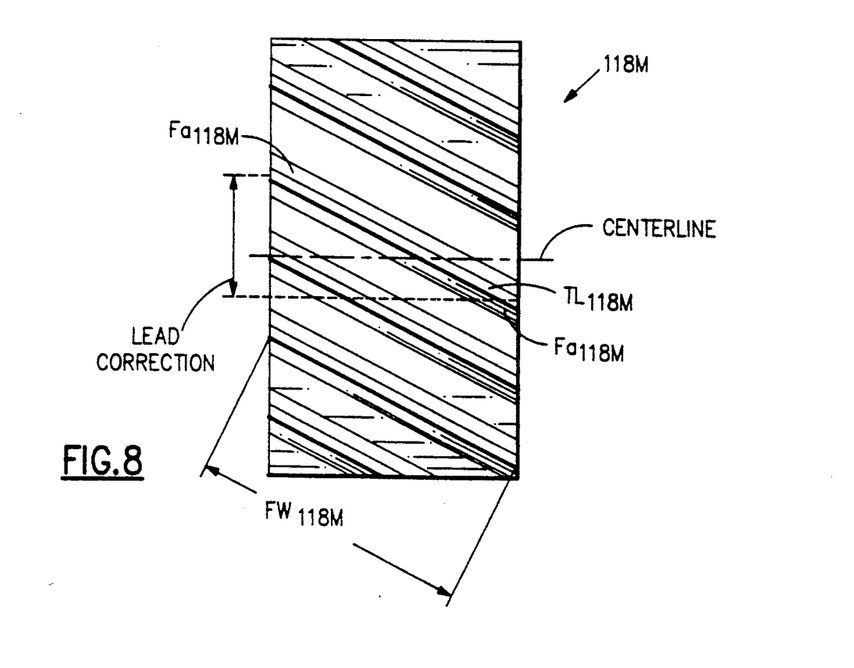
FIG. 8 is a top plan view of a gear tooth of the modified bull pinion according to the present invention schematically illustrating the lead correction modification thereof.

FIG. 8 is a top plan view that schematically illustrates (exaggerated for purposes of illustration) the lead correction for the modified bull pinions 118M of the present invention. The lead correction for the modified bull pinions 118M of the present invention is a right-hand helix correction within the range of 0.0027 to about 0.0029 in/in, as set forth in Table III. This represents about a 165 percent increase in helix correction based upon the mean lead corrections of the prior art bull pinions 118 with respect to the modified bull pinions 118M of the present invention, as enumerated in Tables I and III, respectively. This increase is reflected in the value of the helix angle of the modified bull pinions 118M of the present invention, as set forth in Table III.

The configurational modifications of the bull gearing of the S-76 ® transmission 100M described hereinabove provide about 4 to 5 dB reductions in gearbox vibration levels at the bull gearing meshing frequency. This results in a significant reduction in interior noise levels in the S-76 ® helicopter.

A variety of modifications and variations of the present invention as described hereinabove are possible in light of the above teachings. It is therefore to be understood that, within the scope of the appended claims, the present invention may be practiced otherwise than as specifically described hereinabove.

What is claimed is:

1. A modified spur gearing stage for a transmission for abating noise levels resulting from vibrations due to differential thermal expansion effects in the transmission during stabilized operation thereof, the transmission including a gearbox housing and a standard spur gearing stage having at least one standard driver spur gear mounted in rotatable combination with the gearbox housing and a standard driven spur gear mounted in rotatable combination with the gearbox housing, each of the at least one standard driver spur gear and the standard driven spur gear having a predetermined base circle diameter, a predetermined pitch diameter, and a predetermined outside diameter wherein the at least one standard driver spur gear and the standard driven spur gear in interactive combination define a predetermined design contact ratio during the stabilized operation of the transmission, the gearbox housing being formed from a first metallic material and the standard spur gearing stage being formed from a second metallic material, the first and second metallic materials having disparate coefficients of thermal expansion that produce the differential thermal expansion effects in the gearbox housing during the stabilized operation of the transmission which induce spatial misalignments between the at least one standard driver spur gear and the standard driven spur gear that cause the vibrations in the transmission, said modified spur gearing stage comprising:

at least one modified driver spur gear replacing the at least one standard driver spur gear of the transmission, said at least one modified driver spur gear being formed from the second metallic material and having the predetermined base circle diameter and the predetermined pitch diameter of the at least one standard driver spur gear, said at least one modified driver spur gear further having involute teeth having increased chordal addenda; and a modified driven spur gear replacing the standard driven spur gear of the transmission, said modified driven spur gear being formed from the second metallic material and having the predetermined base circle diameter and the predetermined pitch diameter of the standard driven spur gear, said modified driven spur gear further having involute teeth having increased chordal addenda;

said at least one modified driver spur gear and said modified driven spur gear in interactive combination having an operating contact ratio greater than the predetermined design contact ratio of the standard spur gearing stage at start up of the transmission to counteract the differential thermal expansion effects;

said operating contact ratio of said modified spur gearing stage decreasing during operation of the transmission in response to the differential thermal expansion effects in the gearbox housing such that said operating contact ratio of said modified spur gearing stage is substantially equal to the predetermined design contact ratio at the stabilized operating condition of the transmission, thereby reducing the noise levels of the transmission due to vibrations as a result of the differential thermal expansion effects.

2. The modified spur gearing stage of claim 1 wherein said increased chordal addenda of said at least one modified driver spur gear is equal in magnitude to said increased chordal addenda of said modified driven spur gear such that the change in outside diameter of said at least one modified driver spur gear is equivalent to the change in outside diameter of said modified driven spur gear.

3. A modified spur gearing stage for a helicopter transmission for abating noise levels resulting from vibrations due to differential thermal expansion effects in the helicopter transmission during stabilized operation thereof, the helicopter transmission including a gearbox housing and a standard spur gearing stage having at least one standard bull pinion mounted in rotatable combination with the gearbox housing and a standard bull gear mounted in rotatable combination with the gearbox housing, each of the at least one standard bull pinion and the standard bull gear having a predetermined base circle diameter, a predetermined pitch diameter, and a predetermined outside diameter wherein the at least one standard bull pinion and the standard bull gear in interactive combination define a predetermined design contact ratio during the stabilized operation of the helicopter transmission, the gearbox housing being formed from a first metallic material and the standard spur gearing stage being formed from a second metallic material, the first and second metallic materials having disparate coefficients of thermal expansion that produce the differential thermal expansion effects in the gearbox housing during the stabilized operation of the helicopter transmission which induce spatial misalignments between the at least one standard bull pinion and the standard bull gear that cause the vibrations in the helicopter transmission, said modified spur gearing stage comprising:

at least one modified bull pinion replacing the at least one standard bull pinion of the helicopter transmission, said at least one modified bull pinion being formed from the second metallic material and having the predetermined base circle diameter and the predetermined pitch diameter of the at least one standard bull pinion, said at least one modified bull pinion further having involute teeth having increased chordal addenda; and a modified bull gear replacing the standard bull gear of the helicopter transmission, said modified bull gear being formed from the second metallic material and having the predetermined base circle diameter and the predetermined pitch diameter of the standard bull gear, said modified bull gear further having involute teeth having increased chordal addenda;

said at least one modified bull pinion and said modified bull gear in interactive combination having an operating contact ratio greater than the predetermined design contact ratio of the standard spur gearing stage at start up of the transmission to counteract the differential thermal expansion effects in the gearbox housing;

said operating contact ratio of said modified spur gearing stage decreasing during operation of the helicopter transmission in response to the differential thermal expansion effects in the gearbox housing such that said operating contact ratio of said modified spur gearing stage is substantially equal to the predetermined design contact ratio at the stabilized operating condition of the helicopter transmission, thereby reducing the noise levels of the helicopter transmission due to vibrations as a result of the differential thermal expansion effects in the gearbox housing.

4. The modified spur gearing stage of claim 3 wherein said at least one modified bull pinion comprises first and second bull pinions in interactive combination with said bull gear.

* * * * *